US011238392B2

(12) United States Patent
Naganathan et al.

(10) Patent No.: US 11,238,392 B2
(45) Date of Patent: Feb. 1, 2022

(54) ESTIMATING COMPENSATION

(71) Applicant: Oracle International Corporation, Redwood Shores, CA (US)

(72) Inventors: Ganesh Naganathan, Fremont, CA (US); Pamela Walker-Cleary, San Franciso, CA (US); Rohan R. Shetty, Bangalore (IN); Jayakrishnan Radhakrishnan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1231 days.

(21) Appl. No.: 14/788,536

(22) Filed: Jun. 30, 2015

(65) Prior Publication Data

US 2016/0307130 A1    Oct. 20, 2016

Related U.S. Application Data

(60) Provisional application No. 62/129,744, filed on Mar. 6, 2015.

(51) Int. Cl.
*G06Q 10/06* (2012.01)
*G06Q 40/00* (2012.01)

(52) U.S. Cl.
CPC ... *G06Q 10/0639* (2013.01); *G06Q 10/06398* (2013.01); *G06Q 40/12* (2013.12)

(58) Field of Classification Search
USPC ......................................................... 705/7.38
See application file for complete search history.

(56) References Cited

U.S. PATENT DOCUMENTS

| 2001/0049622 A1* | 12/2001 | Gozdeck .......... G06Q 10/06398 |
| | | 705/7.42 |
| 2007/0083422 A1 | 4/2007 | Keon |
| 2007/0208637 A1* | 9/2007 | Cooper ................. G06Q 20/14 |
| | | 705/30 |
| 2007/0226026 A1* | 9/2007 | Chang .............. G06Q 10/06398 |
| | | 705/7.15 |
| 2008/0281707 A1 | 11/2008 | McGinty et al. |
| 2010/0122218 A1 | 5/2010 | Mahadevan et al. |
| 2014/0012786 A1 | 1/2014 | Coleman et al. |

(Continued)

OTHER PUBLICATIONS

"Incentive Commission Management in SAP CRM", Online Available at <http://scn.sap.com/people/sandeep.nargund/blog/2009/11/16/incentive-commission-management-in-sap-crm-a-quick-overview>, Retrieved on Dec. 22, 2014, 2 pages.

(Continued)

*Primary Examiner* — Eric W Stamber
*Assistant Examiner* — Hector Leal
(74) *Attorney, Agent, or Firm* — Invoke

(57) ABSTRACT

A salesperson may estimate his compensation in different hypothetical scenarios by inputting hypothetical sales data into a compensation estimation system. The compensation estimation system may compute the sales person's hypothetical compensation based on both actual sales data and the hypothetical sales data, thereby producing a "what if" outlook for the sales person. Significantly, the hypothetical sales data can be entered into and modified within the compensation estimation system without modifying or corrupting the actual sales data.

24 Claims, 9 Drawing Sheets

(56) References Cited

U.S. PATENT DOCUMENTS

2014/0324645 A1* 10/2014 Stiffler .................. G06Q 40/12
 705/30
2015/0206089 A1* 7/2015 Shetty .............. G06Q 10/06398
 705/7.42

OTHER PUBLICATIONS

"Sales Management", Workcube E-business, Online Available at <http://www.workcube.com/index.cfm?fuseaction=objects2.detail_content&cid=529>, Retrieved on Dec. 15, 2014, 3 pages.
Xactly Corporation, "Xactly Enables Customers to Improve Sales Visibility and Reduce Compensation Administration Complexity with Latest Version of Xactly Incent", Online Available at <http://www.rembrandtvc.com/news/story/500/xactly-enables-customers-improve-sales>, Retrieved on Dec. 22, 2014, 2 pages.
Infinytics, "Sales Management", Online Available at <http://infinytics.com/SalesManagement>, retrieved on Dec. 15, 2014, 4 pages.
Nice Systems, "Incentive Compensation Management", Online Available at <http://www.nice.com/incentive-compensation-management>, Retrieved on Dec. 15, 2014, 1 page.
Obero SPM, "Incentive Compensation Management", Online Available at <http://www.oberospm.com/solution/incentive-compensation-management/>, retrieved on Dec. 19, 2014, 6 pages.
Oracle, "Oracle Incentive Compensation Analytics for Oracle Data Integrator", Oracle Data Sheet, 2009, 3 pages.
Sales Force, "Best Practices for Sales Managers", Sales Force Customer Research Survey, Apr. 2010, 51 pages.
SAP, "A Winning Cloud Sales Solution", SAP Cloud for Sales Redefines Sales Effectiveness, 2013, 12 pages.
Solution, "Obero SPM", Online Available at <http://www.oberospm.com/solution/>, retrieved on Dec. 19, 2014, 5 pages.

* cited by examiner

| Pay Component | Scenario1 | Scenario2 |
|---|---|---|
| Commission | $100 | $100 |
| SPIFF Bonus | $30 | $80 |

Screenshot 310

Compensation Component 392

Scenario 394 scenario 396

FIG. 3F

ESTIMATING COMPENSATION

BENEFIT CLAIM; INCORPORATION BY REFERENCE

This application claims the benefit of U.S. Provisional patent application 62/129,744, filed Mar. 6, 2015, which is incorporated herein by reference.

TECHNICAL FIELD

The present disclosure relates to estimating compensation. In particular, the present disclosure relates to estimating compensation based on non-materialized sales entries.

BACKGROUND

Sales compensation plans may include a variety of complex factors including, but not limited to, a base salary, commission rates, bonuses, accelerators, and quotas. Due to the complexity, the amount of compensation due to a salesperson is difficult to compute. In some instances, the amount of compensation earned is not known to a salesperson until actual payment is received by the salesperson, which is long after the sales events forming the basis for the compensation have occurred. For example, compensation paid during a current period, this month may correspond to sales events completed during a previous period, last month. In some instances, the amount of compensation that will be earned by a salesperson for a particular sales event is not determined until a late stage in the sales cycle of that particular sales event. A late stage in the sales cycle may refer to collection of payment for the sales event, delivery of goods or services, invoicing, or booking of a deal, which may occur long after a sales event is first proposed, offered, or entered into.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3B-3F illustrate an example set of user interfaces for estimating compensation in accordance with one or more embodiments.

DETAILED DESCRIPTION

Figure 1:
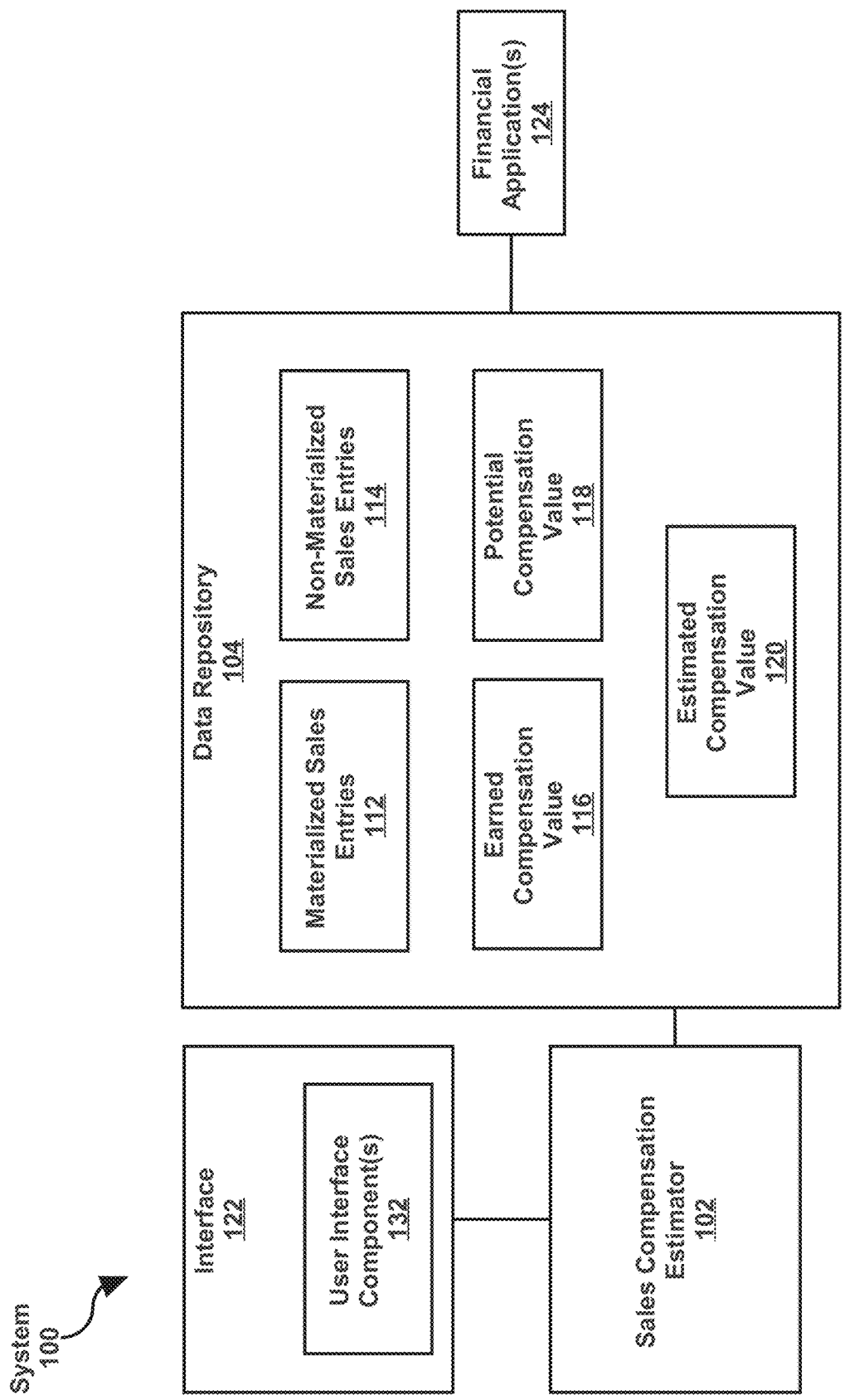
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

In one or more embodiments, an estimated compensation value for an individual salesperson is determined based at least on a set of materialized sales entries and a set of non-materialized sales entries. For example, using some embodiments of the invention, a salesperson may estimate his compensation in different hypothetical scenarios by inputting hypothetical sales data into a compensation estimation system. The compensation estimation system may compute the salesperson's hypothetical compensation based on both actual sales data and the hypothetical sales data, thereby producing a "what if" outlook for the salesperson. Significantly, the hypothetical sales data can be entered into and modified within the compensation estimation system without modifying or corrupting the actual sales data.

In an embodiment, a set of materialized sales entries includes data corresponding to sales events that have been materialized. Materialization refers to one or more particular stages in a sales cycle, for example, invoicing, delivery of goods and services, and/or collection of payment. In an example, the set of materialized sales entries includes "live data," which reflects transactional sales data as stages of a sales cycle are completed. In an example, the set of materialized sales entries is a source of data for other financial applications and/or other users.

In an embodiment, a set of non-materialized sales entries includes data corresponding to sales events that have not been materialized, such as hypothetical sales events that a salesperson has not yet been pursued. In an example, the set of non-materialized sales entries and the set of materialized sales entries are stored separately and/or stored using different data objects. In an example, the set of non-materialized sales entries does not modify the set of materialized sales entries.

The set of non-materialized sales entries are entered via a user interface associated with non-materialized sales entries. In an example, the user interface associated with non-materialized sales entries includes a field for receiving user input defining an attribute of a non-materialized sales entry. The user interface includes a field for selecting a non-materialized sales entry from a candidate set of non-materialized sales entries. In an example, the user interface associated with non-materialized sales entries is displayed concurrently with the estimated compensation value.

In an embodiment, an estimated compensation value for an individual salesperson is determined based at least on an earned compensation value and a set of non-materialized sales entries. In an example, the earned compensation value is computed as a function of materialized sales entries and stored in a database. Determining the estimated compensation value includes accessing the previously stored earned compensation value without accessing the materialized sales entries. In one example, determining the estimated compensation value includes adding the earned compensation value with a potential compensation value that is computed as a function of the non-materialized sales entries.

2. Architectural Overview

FIG. 1 illustrates a system 100 in accordance with one or more embodiments. As illustrated in FIG. 1, system 100 includes a sales compensation estimator 102, a data repository 104, an interface 122, and one or more financial applications 124. In one or more embodiments, System 100 may include more or fewer components, than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In one or more embodiments, data repository 104 is any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be or may execute on the same computing system as sales compensation estimator 102. Alternatively or additionally, data repository 104 may be on a separate computing system than sales compensation estimator 102. Data repository 104 may be connected to sales compensation estimator 102 via a direct connection or via a network.

In an embodiment, data repository 104 includes a set of one or more materialized sales entries 112, a set of one or more non-materialized sales entries 114, an earned compensation value 116, a potential compensation value 118, and an estimated compensation value 120. The set of materialized sales entries 112 and the set of non-materialized sales entries 114 may be stored in any type of data object or data structure, including but not limited to one or more databases, tables, linked lists, vectors, arrays, and/or data files.

In one or more embodiments, a materialized sales entry 112 includes data corresponding to a sales event that has been materialized. Materialization refers to completion of one or more particular stages in a sales cycle, as defined by an organization, a company, or a system. Stages of a sales cycle include but are not limited to building a relationship with a prospective customer, making an offer, negotiating, closing a deal, invoicing, delivery of goods or services, and/or collection of payment. Materialization may refer to a different stage in different companies or contexts. In an example, a materialized sales entry may refer to a non-prospective sales entry. The materialized sales entry refers to a sales entry that was previously a prospective sales entry and that has since reached completion of a particular stage in the sales cycle.

In an embodiment, materialized sales entries 112 are maintained directly in a data source that reflects transactional sales data as stages of a sales cycle are completed. A current stage of a sales event is tracked by the data source. This data source may be referred to herein as a "live data source," and the data stored therein may be referred to herein as "live data." In an example, a customer order for a product is received. A sales entry in the data source is updated with the customer name and address from the customer order, and the current stage of the sales entry is updated to "Order Received." Then, the product is shipped. The sales entry is updated to include the shipping fees incurred, and the current stage is updated to "Shipped." The update may be performed manually; for example, the update may be entered by the salesperson or an administrative assistant. Alternatively, the update may be performed automatically by one or more applications. For example, when an invoice for a sales event is generated by an invoicing application, data corresponding to that sales event may be extracted from the invoice and automatically entered into the data source.

In an embodiment, materialized sales entries 112 are maintained directly in a data source that reflects transactional sales data and serves as a direct source of data for sales compensation estimator 102, financial applications 124, and/or users. When information about sales events is needed, sales entries are directly retrieved from the live data source, and staging or duplicating the sales entries, or temporarily storing the sales entries in an intermediate data structure, is not necessary. In an example, information from the live data source is accessed by a chief executive officer to create an accounting report. In another example, information from the live data source is accessed by a team leader through a customer relationship management (CRM) application to determine the status of sales for the team. In another example, information from the live data source is accessed by a manager to determine the performance goals of subordinates. In an example, information from the live data source is accessed by administrative personnel to generate an invoice, a shipping label, or other documentation for a sales event.

In an embodiment, materialized sales entries 112 are a subset of sales entries that are stored in a live data source as having reached completion of a particular stage in the sales cycle. In an example, in one context, materialization is completion of the billing stage. In an example, sales compensation estimator 102 queries for materialized sales entries 112 in order to determine an estimated compensation value. Sales entries stored as having completed the billing stage are directly retrieved by sales compensation estimator 102 from the live data source.

In one or more embodiments, a non-materialized sales entry 114 includes data corresponding to a sales event that has not been materialized. In an example, a non-materialized sales entry refers to a prospective sales entry. In an example, a non-materialized sales entry refers to a pending sales entry. In an example, a non-materialized sales entry includes a hypothetical sales event. A non-materialized sales entry may be defined by a salesperson before obtaining any lead or prospect of completing the corresponding sale.

In an embodiment, the set of non-materialized sales entries 114 are system-generated. For example, the set of non-materialized sales entries may be generated based on historical sales data, or sales trajectory data. A system may determine a trajectory of sales for company XYZ for the prior five years and may identify a pattern of increase based on the trajectory. Based on the pattern of increase, the system may determine a set of non-materialized sales entries for the current year.

In an example, the set of non-materialized sales entries and the set of materialized sales entries are stored separately and/or stored using different data objects. In an example, user input entered via interface 122 requesting initiation of an estimation process that generates an estimated compensation value based on a non-materialized sales entry does not modify the set of materialized sales entries.

In one or more embodiments, estimated compensation value 120 is an amount of compensation determined by sales compensation estimator 102 to be due to a salesperson based on both the set of materialized sales entries 112 and the set of non-materialized sales entries 114. The estimated compensation value is due to the salesperson if the set of non-materialized sales entries materializes, for example, by completion of the sale by the salesperson.

In an embodiment, the estimated compensation value 120 is a function of earned compensation value 116 (described below) and non-materialized sales entries 114.

In an example, estimated compensation value 120 is determined using one or more compensation algorithms specified by a sales compensation plan. A compensation algorithm may include a base salary, commission rate, bonus, spiff bonus, or other components. A base salary is a fixed amount that is to be earned by a salesperson over a particular period of time, regardless of sales volume. A commission rate is a percentage that is to be applied to a sales revenue or profit achieved by a salesperson. A bonus is a lump sum amount that is added upon achievement of a particular goal, such as a quota. A spiff bonus is a type of bonus that is added based on the sale of a specific product. In an example, a plurality of compensation algorithms are specified by a sales compensation plan. A particular compensation algorithm is selected from the plurality of compensation algorithms based on one or more accelerators or performance metrics. An accelerator increases a commission rate, bonus, or other compensation component, based on a performance metric being met or achieved. A performance metric is any attribute by which a salesperson is evaluated. A performance metric may be a quota or another threshold number. A quota may be a revenue amount, a profit amount, a sales volume or quantity, or the like, and may or may not be product-specific. For example, a quota may be a threshold number of sales in one or more particular products. A performance metric may be based on the performance of an individual salesperson and/or a sales team.

In one or more embodiments, potential compensation value 118 is an amount of compensation due to a salesperson corresponding to the set of non-materialized sales entries 114. Potential compensation value 118 is determined as if the set of non-materialized sales entries 114 were materialized. Potential compensation value 118 may be determined in various ways. In an example, potential compensation value 118 may be an input to sales compensation estimator 102 for determining estimated compensation value 120. In another example, estimated compensation value 120 may be an input to sales compensation estimator 102 for determining potential compensation value 118.

In one or more embodiments, earned compensation value 116 is an already earned amount of compensation that is due to a salesperson corresponding to the set of materialized sales entries 112. Earned compensation value 116 may be determined in various ways. In an example, earned compensation value 116 is computed upon an update of the set of materialized sales entries 112. Once earned compensation value 116 is computed, earned compensation value 116 is stored at data repository 104 and may be repeatedly retrieved for use. For example, earned compensation value 116 may be retrieved by sales compensation estimator 102 and added to potential compensation value 118 to determine estimated compensation value 120. As another example, earned compensation value 116 may be accessed by financial applications 124.

In one or more embodiments, sales compensation estimator 102 refers to hardware and/or software configured to perform operations described herein for determining an estimated compensation value 120. Sales compensation estimator 102 communicates with interface 122 and data repository 104.

In an embodiment, the sales compensation estimator 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a video gaming console, a printer, a mobile handset, a smartphone, and a personal digital assistant ("PDA").

Interface 122 is any type of input/output (I/O) interface, including but not limited to a screen, a monitor, a touchscreen, a keyboard, a mouse, a speaker, a microphone. Data received through interface 122 may be stored at data repository 104. Interface 122 is configured to display one or more user interface components 132.

In one or more embodiments, user interface components 132 includes one or more input/output (I/O) interfaces, which may be implemented at one or more devices. User interface components 132 include functionality for presenting any type of visual, audio, tactile, or other sensory information generated by sales compensation estimator 102. In an example, user interface components 132 refer to Graphical User Interface (GUI) elements. User interface components 132 include functionality for accepting user input. For example, user interface components include text fields, radio buttons, check boxes, and/or user input components through which a user may enter user input. All or a subset of user interface components 132 may be displayed independently of each other, sequentially, or simultaneously with each other. All or a subset of user interface components 132 may interact with each other. For example, one user interface component 132 includes a button or other interactive field that triggers the presentation of another user interface component 132.

In one or more embodiments, user interface component 132 is a user interface associated with a set of non-materialized sales entries. User interface component 132 is configured to receive user input requesting initiation of an estimation process that generates an estimated compensation value based on one or more non-materialized sales entries. User interface component 132 may include a field configured to receive an input, such as a numerical or textual value, defining an attribute of a non-materialized sales event. Attributes of a non-materialized sales entry include but are not limited to a name of the non-materialized sales entry, a name of a customer, a quantity of goods to be sold, a price of the goods, a discount on the price, a revenue, a profit margin, a currency type, an expected closing date, and a credit split (such as, a percentage of the sales event that is credited to an individual salesperson). User interface component 132 may also include a field configured to receive an input, such as a checkbox or a radio button, selecting a non-materialized sales entries from a candidate set of non-materialized sales entries that were previously stored.

In one or more embodiments, user interface component(s) 132 present an estimated compensation value 120, an earned compensation value 116, and a potential compensation value 118. Various types of presentations may be used. In an example, user interface component 132 displays an estimated compensation value as a numerical value or as a bar chart. In another example, multiple user interface components 132 are displayed together. For example, a portion of a bar of a bar chart represents an earned compensation value 116, while another portion of the bar represents a potential compensation value 118, and both portions together represent an estimated compensation value 120. As another example, a portion of a pie of a pie chart represents an earned compensation value 116, while another portion of the pie chart represents a potential compensation value 118, and both portions together represent an estimated compensation value 120.

Figure 2:
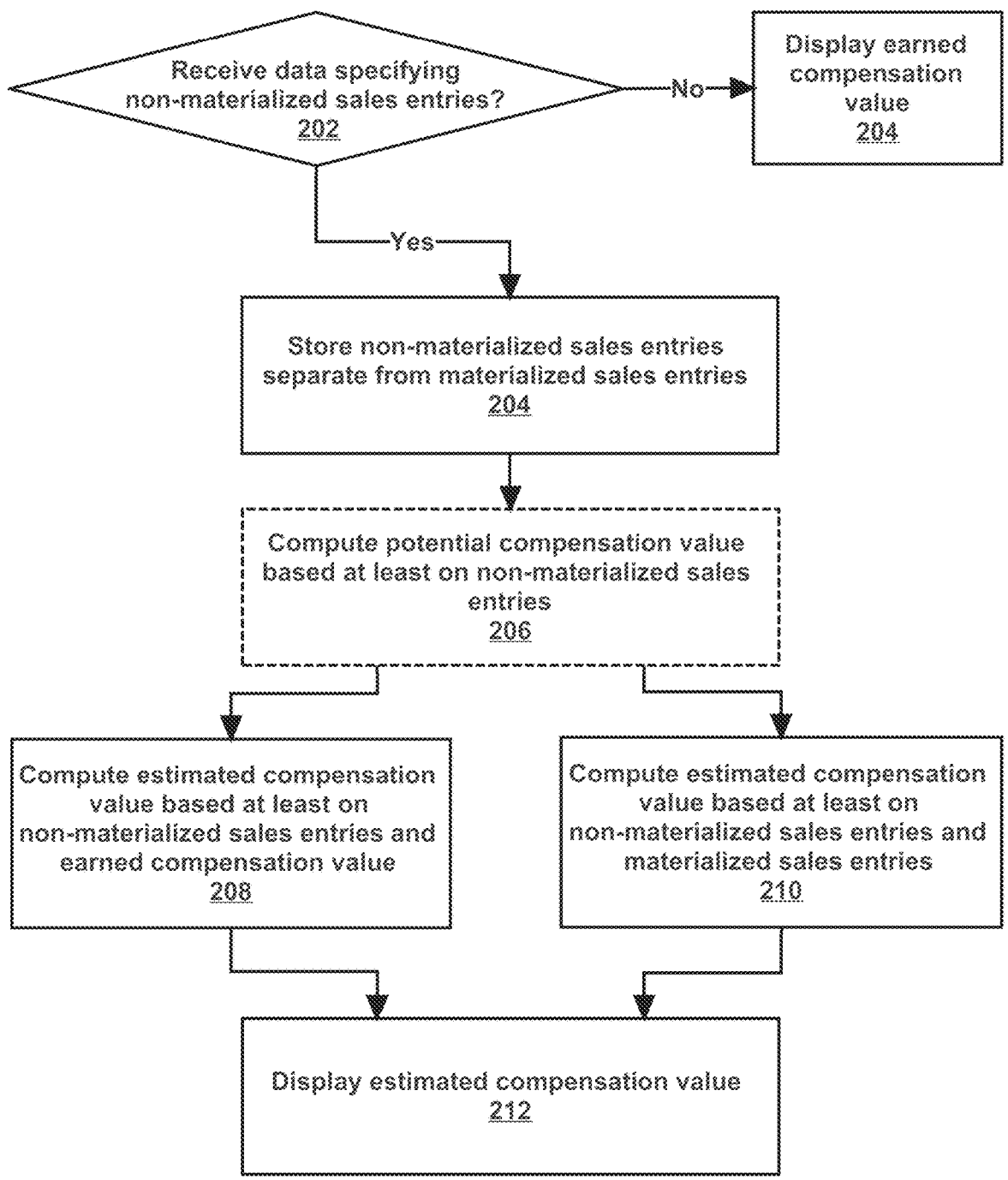
FIG. 2 illustrates an example set of operations for estimating compensation in accordance with one or more embodiments.

3. Determining Estimated Compensation Values Based on Non-Materialized Sales Entries FIG. 2 illustrates an example set of operations for estimating compensation in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

Initially, an inquiry is made as to whether user input requesting initiation of an estimation process that generates an estimated compensation value of an individual salesperson based on one or more non-materialized sales entries is received (Operation 202). In an example, user input requesting initiation of the estimation process is received through a user interface, such as a user interface associated with non-materialized sales entries as described herein. In an example, user input requesting initiation of the estimation process includes data defining an attribute of a non-materialized sales entry. For example, the user may enter information defining a price, volume, customer name, currency, or other attribute of a non-materialized sales entry.

In another example, user input requesting initiation of the estimation process includes data selecting one or more non-materialized sales entries from a candidate set of non-materialized sales entries that is previously stored. The selection may be made through checkboxes, radio buttons, a menu option, text entry, and/or a list. A first subset of non-materialized sales entries may be selected from the candidate set of non-materialized sales entries, to compute a first estimated compensation value, and a second subset of non-materialized sales entries may be selected from the candidate set of non-materialized sales entries, to compute a second estimated compensation value. A subset of non-materialized sales entries selected from the candidate set of non-materialized sales entries is referred to herein as a scenario. By storing the candidate set of non-materialized sales entries, and receiving user input selecting at least a subset thereof, various estimated compensation values may be computed based on various subsets of the candidate set of non-materialized sales entries. Thus different scenarios may be compared without the need to re-enter attributes of a non-materialized sales entry.

In an example, user input requesting initiation of the estimation process automatically defines and/or selects non-materialized sales entries using one or more modules or applications. In an example, a default selection of previously stored non-materialized sales entries from a candidate set of non-materialized sales entries occurs. The default may, for example, select non-materialized sales entries that are within a time window, such as, within one month of an expected closing date. In another example, attributes of a non-materialized sales entry are automatically defined based on a sales trajectory that is determined by an application. A sales trajectory includes sales events predicted for the future based on historical sales data of one or more salespersons, sales teams, or organizations. Historical sales data of one or more salespersons may be retrieved from the set of materialized sales entries for the salespersons. Further, a non-materialized sales entry may be defined and/or selected automatically based on a sales goal, the performance of other salespersons, the performance of the industry, or other data.

In an embodiment, if user input requesting initiation of the estimation process is not received, then an earned compensation value of the individual salesperson is displayed (Operation 204). The earned compensation value may be previously determined and stored in memory, or may be determined in real time. In an example, when one or more materialized sales entries are added to the set of materialized sales entries, a compensation algorithm is applied to the set of materialized sales entries, and an earned compensation value is computed. The earned compensation value is stored and available for later retrieval. When the earned compensation value is to be displayed, the earned compensation value is simply retrieved without being re-computed. For example, a homepage of the user account displays an earned compensation value. Thus, when a user account is logged in and the homepage is to be displayed, the earned compensation value (which was computed and stored prior to the logging in) is retrieved and displayed.

In another example, when the earned compensation value is to be displayed, the earned compensation value is computed based on the set of materialized sales entries. In real time, the set of materialized sales entries is accessed, and a compensation algorithm is applied to the materialized sales entries to obtain the earned compensation value. Thus, when a user account is logged in and the homepage is to be displayed, the set of materialized sales entries (which was stored prior to the logging in) is accessed, and the earned compensation value is then computed at runtime based on the materialized sales entries and displayed. In an example, the earned compensation value is computed based on the set of materialized sales entries directly retrieved from a live data source, which reflects transactional sales data, without staging the set of materialized sales entries.

In an embodiment, if user input requesting initiation of the estimation process that generates an estimated compensation value based on non-materialized sales entries is received, then the non-materialized sales entries are stored separately from the materialized sales entries (Operation 204). Separately storing the non-materialized sales entries from the materialized sales entries includes any method of storage in which the non-materialized sales entries and/or the estimation process does not affect or modify the set of materialized sales entries. In one example, the set of non-materialized sales entries of an individual salesperson and the set of materialized sales entries of the individual salesperson are stored on separate data objects, data structures, data repositories, or databases. The non-materialized sales entries does not affect or modify the one or more data objects, data structures, data repositories, or databases, on which the set of materialized sales entries are stored. In another example, each of the set of materialized sales entries and the set of non-materialized sales entries are stored in a same data structure without affect the other. In one embodiment, the set of materialized sales entries are stored in nodes of a linked list that are separate from the nodes in which the set of non-materialized sales entries are stored.

The non-materialized sales entries may be stored in a user account associated with an individual salesperson. Thus, the non-materialized sales entries may be retrieved on subsequent logins of the individual salesperson. Alternatively, the non-materialized sales entries may be temporarily stored and deleted after a current session is over.

In an example, the set of materialized sales entries are configured to be used for purposes other than or in addition to estimating compensation. In an example, the set of materialized sales entries is a subset of sales entries stored in a live data source, which reflects transactional sales data. In another example, the set of materialized sales entries (or the data unit on which the sets of materialized sales entries are stored) is accessed by one or more financial applications, such as a customer relationship management (CRM) application, or an accounting application. In another example, the set of materialized sales entries are configured to record financial information corresponding to an organization, such as tax records, financial forecasts, or profit reports. In another example, the set of materialized sales entries are accessed by users other than the individual salesperson whose compensation is being estimated, such as managers or team leaders, in order to evaluate the individual salesperson, the sales team, or the organization. Thus, any modification to the set of materialized sales entries has downstream effects on other purposes that are served by the set of materialized sales entries. Since the set of non-materialized sales entries are stored separately, the set of non-materialized sales entries do not have any downstream effects on purposes other than estimating compensation of the individual salesperson.

In an embodiment, a potential compensation value is optionally computed (Operation 206). The potential compensation value is computed based at least on the non-materialized sales entries. In an example, the potential compensation value is computed by applying a compensation algorithm to the non-materialized sales entries. For example, if a commission is x percent (x %) of a revenue n from the non-materialized sales entries, then the potential compensation value is n×x %.

In an example, the compensation algorithm to be applied is selected based on whether one or more performance metrics are met. A performance metric may be based on revenue, number of products sold, number of customers, number of new customers, or other attributes, and may or may not be product-specific. For example, a performance metric may be a threshold amount P of revenue from sales events over a given time period. The revenue from sales events over the given time period is calculated by aggregating the revenue m from the materialized sales entries over the given time period and the revenue n from the non-materialized sales entries. If the revenue over the given time period is less than the threshold ((n+m)<P), then a first compensation algorithm is applied; else if the revenue over the given time period is equal to or greater than the threshold ((n+m)≥P), then a second compensation algorithm is applied. In an example, the second compensation algorithm may have a larger commission rate and/or bonus, which rewards a salesperson for outstanding performance. In another example, the second compensation algorithm may have a smaller commission rate and/or bonus, which discourages a salesperson from over-focusing on certain products.

In an example, the performance metric is based on not only the performance of an individual salesperson but also the performance of a sales team. For example, a performance metric may be a threshold amount P of revenue from sales events over a given time period for an entire sales team. The set of materialized sales entries for the sales team may be retrieved, and aggregated with the set of non-materialized sales entries entered for the individual salesperson, to determine whether the performance metric is met.

In one embodiment, which should not be construed as limiting the scope of the claims, a compensation algorithm that is applied when a threshold is met only affects sales entries made after the threshold is met. For example, for revenue below the threshold P, a commission rate x % may be applied, and for revenue equal to or above the threshold P, x % applies to the revenue below the threshold P while another commission rate y % is applied to the revenue equal to or above the threshold P. In another example, a compensation algorithm that is applied when a threshold is met affects sales entries made both after and before the threshold is met. For example, for revenue below the threshold P, a commission rate x % may be applied, and for revenue equal to or above the threshold P, another commission rate y % may be applied to the entire revenue. In this case, an accelerator function accelerates the rate of earnings for the revenue made both before and after the threshold is met.

In an example, the potential compensation value may be computed by selecting the compensation algorithm based on an aggregate of the non-materialized sales entries and the materialized sales entries, and applying the compensation algorithm to the non-materialized sales entries. In another example, the potential compensation value may be computed by selecting the compensation algorithm based on a previous determination that a performance metric is met by the materialized sales entries, thus obviating the need to retrieve the materialized sales entries at the time of computation. The compensation algorithm may then be applied to the non-materialized sales entries.

In an embodiment, an estimated compensation value is computed based at least on the non-materialized sales entries and the earned compensation value (Operation 208). In an example, the estimated compensation value may be computed by aggregating the potential compensation value and an earned compensation value. In an example, the earned compensation value may be computed prior to the time of computation of the estimated compensation value. For example, the earned compensation value may be computed whenever a new materialized sales entry is created, or whenever a sales entry reaches materialization. A compensation algorithm to be applied to the materialized sales entries is selected based on whether a performance metric is met by the materialized sales entries. Thus, at the time of computation of the estimated compensation value, the earned compensation value simply may be retrieved, obviating the need to retrieve the materialized sales entries.

Computing the estimated compensation value based on a previously determined earned compensation value is accurate if a compensation algorithm applied to previous sales entries is not changed when a performance metric is met. That means, in an embodiment, which should not be construed as limiting the scope of the claims, prior to a performance metric being met, a first compensation algorithm applies, and after the performance metric is met, the first compensation algorithm still applies to sales entries prior to the performance metric being met but a second compensation algorithm applies only to sales entries after the performance metric is met. Thus, in an embodiment, the earned compensation value corresponding to the materialized sales entries is not changed even if a performance metric is met by an aggregate of the materialized sales entries and the non-materialized sales entries.

In an embodiment, the estimated compensation value is computed based on the non-materialized sales entries and the materialized sales entries (Operation 210). In an example, the estimated compensation value may be computed by applying a compensation algorithm to an aggregate of the non-materialized sales entries and the materialized sales entries, which is referred to herein as a set of estimated sales entries. The materialized sales entries are retrieved at the time of computation. A compensation algorithm may be selected based on whether a performance metric is met by the set of estimated sales entries. Then the selected compensation algorithm may be applied to the set of estimated sales entries. Computing the estimated compensation value based on the set of estimated sales entries is accurate regardless of whether a compensation algorithm applied to sales entries is changed when a performance metric is met. For example, in an embodiment, prior to a performance metric being met, a first compensation algorithm applies, and after the performance metric is met, a second compensation applies to sales entries both before and after the performance metric is met. In this example, the earned compensation value changes based on whether the set of estimated sales entries meets a performance metric that the set of materialized sales entries themselves did not. Hence, the estimated compensation value is computed by retrieving the set of materialized sales entries and applying a compensation algorithm to an aggregate of the set of materialized sales entries and the set of non-materialized sales entries.

In an example, the estimated compensation value is not accessed by another financial application or another user. The estimated compensation value does not have downstream effects on another financial application or another user. The estimated compensation value does not modify the set of materialized sales entries in this example.

In an example, an estimated compensation value is displayed (Operation 212). The estimated compensation value may be displayed in various formats, such as a numerical value, graph, bar chart, pie chart, percentage, or other representations. The estimated compensation value may also be presented using other user interfaces, such as using sound through a speaker.

In an example, the estimated compensation value may be concurrently displayed with other user interface components. In an example, the estimated compensation value may be concurrently displayed with the potential compensation value and/or the earned compensation value. In another example, the estimated compensation value may be concurrently displayed with a user interface associated with non-materialized sales entries, including fields for defining an attribute of a non-materialized sales entry and/or fields for selecting a non-materialized sales entry from a candidate set of non-materialized sales entries.

In an embodiment, a potential compensation value is computed for display based on a difference between the estimated compensation value and the earned compensation value. In an example, the earned compensation value may be computed using a first commission percentage that is based solely on the materialized sales entries. The estimated compensation value may be computed using a second commission percentage (different than the first commission percentage) that is selected based on a total of the materialized sales entries and the non-materialized sales entries. Under the second commission percentage, the portion of earnings corresponding to the materialized sales entries differs from the earned compensation value corresponding to the materialized sales entries that are computed using the first commission percentage. In this example, the potential compensation value is a function of both (a) the non-materialized sales entries and (b) the difference in earnings corresponding to the materialized sales entries computed based on different commission percentages. The potential compensation value is computed by first computing the estimated compensation value and subtracting out the earned compensation value.

5. Example Embodiment

FIGS. 3B-3F illustrate an example set of user interfaces for estimating compensation in accordance with one or more embodiments. FIG. 3A illustrates an example flowchart of an example set of user interfaces for estimating compensation in accordance with one or more embodiments, with reference to FIGS. 3B-3F. One or more operations illustrated in FIG. 3A may be modified, rearranged, or omitted all together. Accordingly, the particular sequence of operations illustrated in FIG. 3A should not be construed as limiting the scope of one or more embodiments.

Figure 3A:
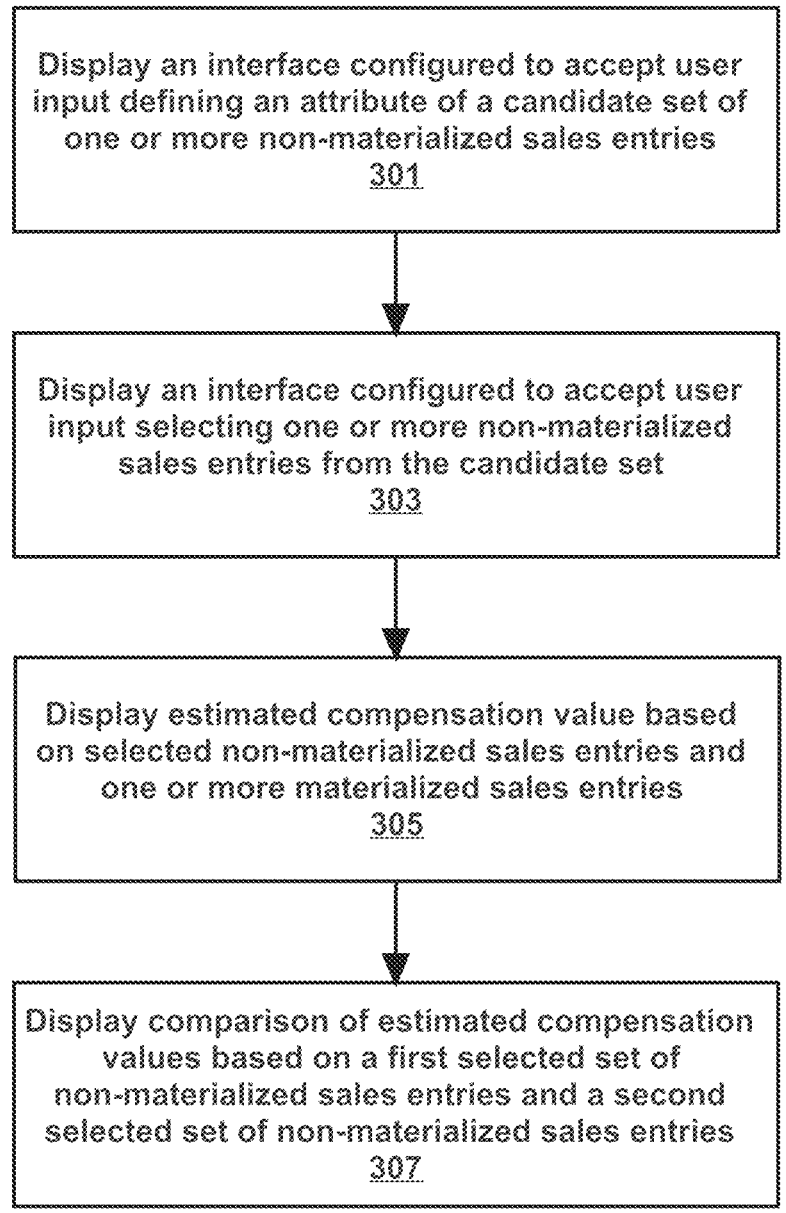
FIG. 3A illustrates an example flowchart of an example set of user interfaces for estimating compensation in accordance with one or more embodiments.
Figure 3B:
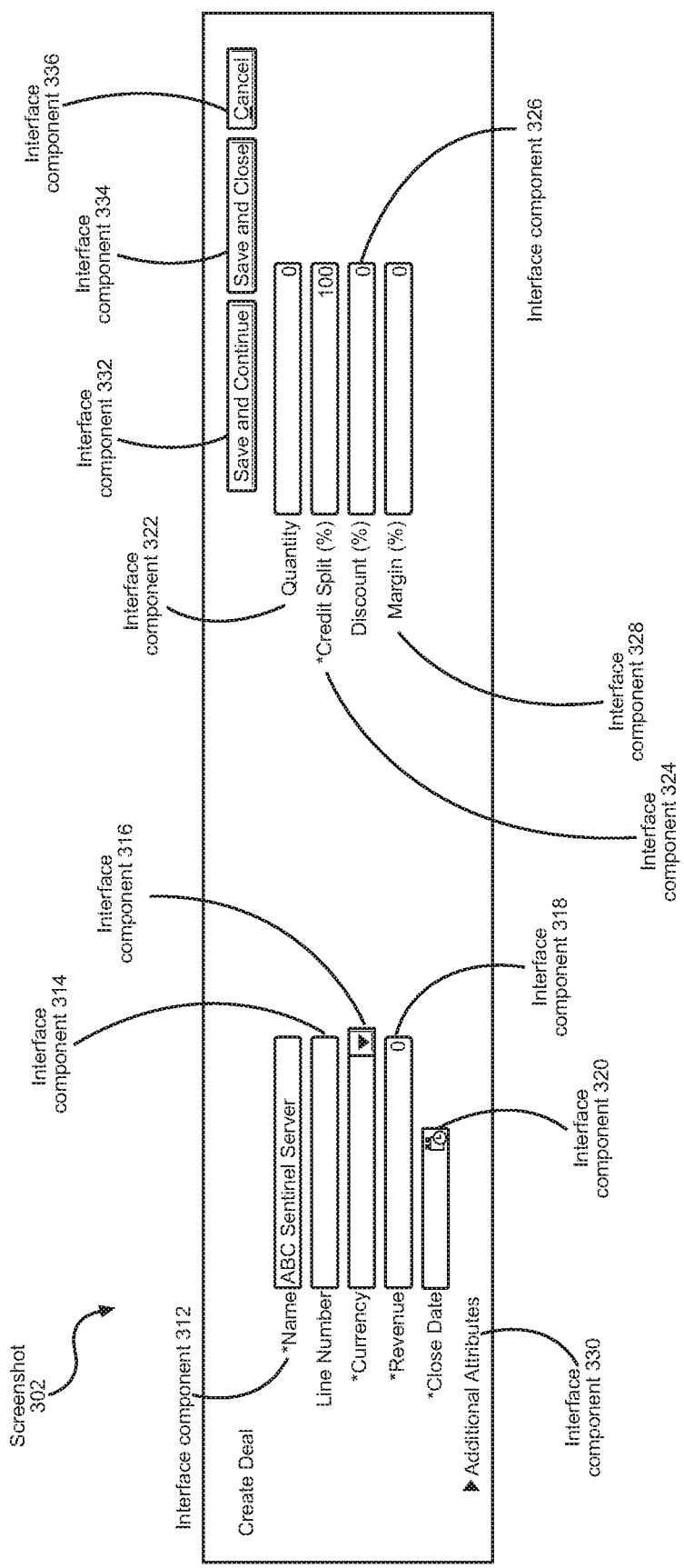

In an example, initially, an interface configured to accept user input defining an attribute of a candidate set of one or more non-materialized sales entries is displayed (Operation 301). As illustrated in FIG. 3B, screenshot 302, including interface components 312-336, is a user interface associated with non-materialized sales entries. Screenshot 302 may be used to create a new non-materialized sale entry or to modify an existing non-materialized sale entry. Interface components 312-336 are dedicated for defining attributes of a non-materialized sale entry, including a name of the non-materialized sale entry (interface component 312), line number (interface component 314), currency (interface component 316), revenue (interface component 318), close date (interface component 320), quantity (interface component 322), credit split (interface component 324), discount (interface component 326), and margin (interface component 328). Additional attributes may be entered via interface component 330. A interface component may be entered via text (for example, interface component 312), a numerical value (for example, interface component 318), a dropdown menu (for example, interface component 316), a date selector (for example, interface component 320), or a percentage (for example, interface component 324). A interface component may be required (for example, as indicated by the asterisk for interface components 312, 316, 318, 320, and 324) or may be optional. After a user has entered data into interface components 312-336, the non-materialized sales entry may be saved. The user may save and continue editing the non-materialized sales entry by clicking interface component 332. The user may save and close screenshot 302 by clicking interface component 334. The user may cancel the entry by clicking interface component 336. Interface components 332-336 may be buttons or other user interface components. A candidate set of one or more non-materialized sales entries is created or modified and then stored via screenshot 302.

Figure 3C:
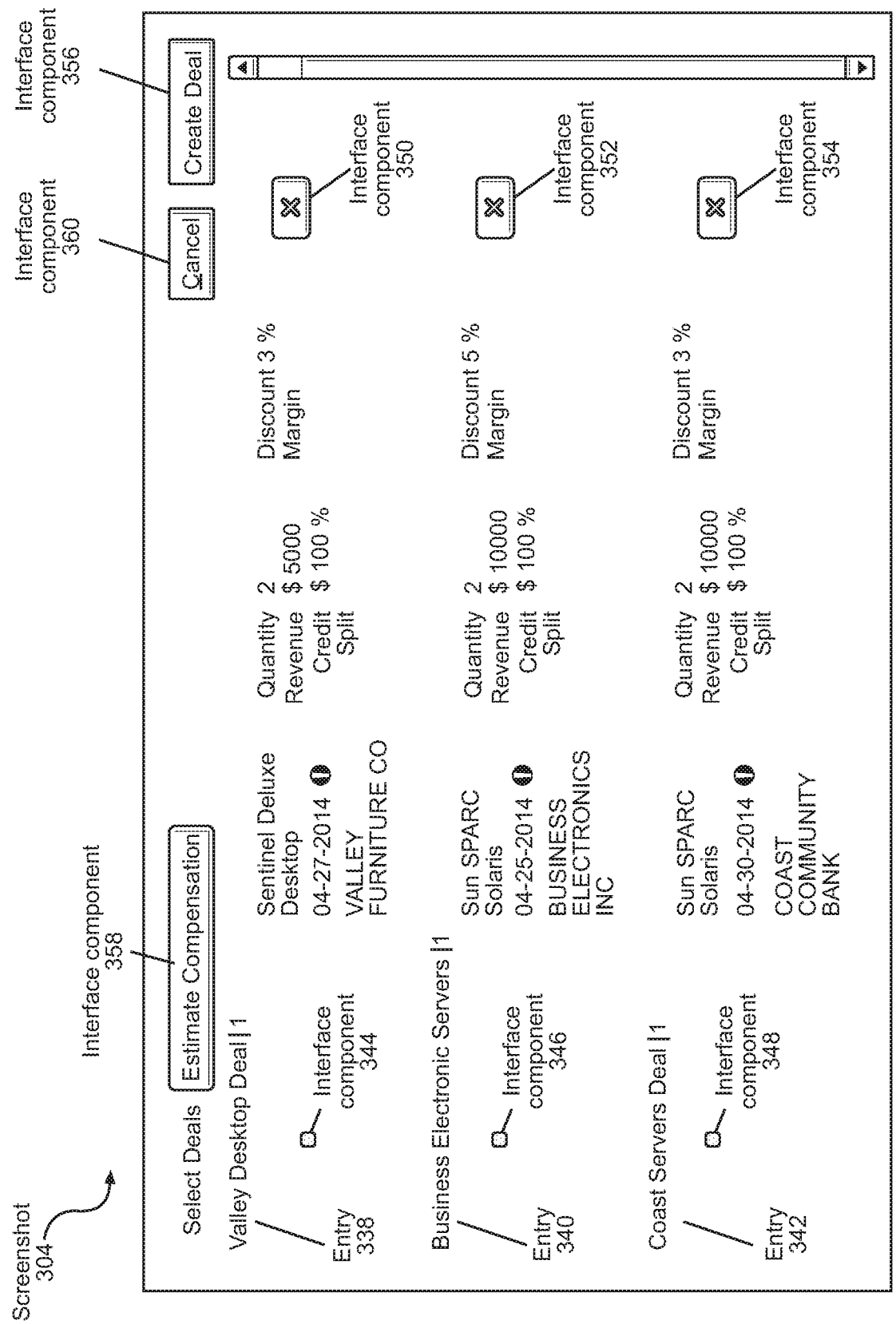

In an example, an interface configured to accept user input selecting one or more non-materialized sales entries from the candidate set is displayed (Operation 303). As illustrated in FIG. 3C, screenshot 304, including entries 338-342 and interface components 344-360, is another user interface associated with non-materialized sales entries. In an example, screenshot 304 is displayed after interface component 334 is selected in screenshot 302. Entries 338-342 display information from a candidate set of non-materialized sales entries that was previously entered and stored, for example, via screenshot 302. For example, entry 338 is named "Valley Desktop Deal." A user anticipates to sell two products and make a revenue of $5,000, with a close date of Apr. 27, 2014, in this prospective sales event. Interface components 344-348 may be used to select from entries 338-342 respectively. For example, by selecting interface component 344, entry 338 is selected. Interface components 344-348 may be checkboxes, radio buttons, or other user interface components. Interface components 350-354 may be used to delete a non-materialized sales entry from the candidate set. For example, by selecting interface component 352, entry 340 is deleted. Interface components 350-354 may be buttons, checkboxes, or other user interface components. In an example (not shown), interface components 350-354 are checkboxes, allowing for batch deletion of entries 338-342. In another example (not shown), one or more interface components allow for modification of entries 338-342. Interface component 356 allows creation of a new non-materialized sales entry to be added to the candidate set. In an example, when interface component 356 is selected, screenshot 302 is shown, allowing attributes of the new non-materialized sales entry to be defined and saved. After the non-materialized sales entry is saved, screenshot 302 is closed and screenshot 304 is shown, with the addition of the new non-materializes sales entry. The new non-materialized sales entry may then be selected by clicking a checkbox, similar to interface components 344-348. After the non-materialized sales entries to be used for estimating compensation are selected, interface component 358 may be selected. Interface component 358 causes initiation of an estimation process that generates an estimated compensation value based on the selected non-materialized sales entries. Interface component 358 may be a button, or another user interface component. Interface component 360 may be selected to cancel computation of an estimated compensation value.

Figure 3D:
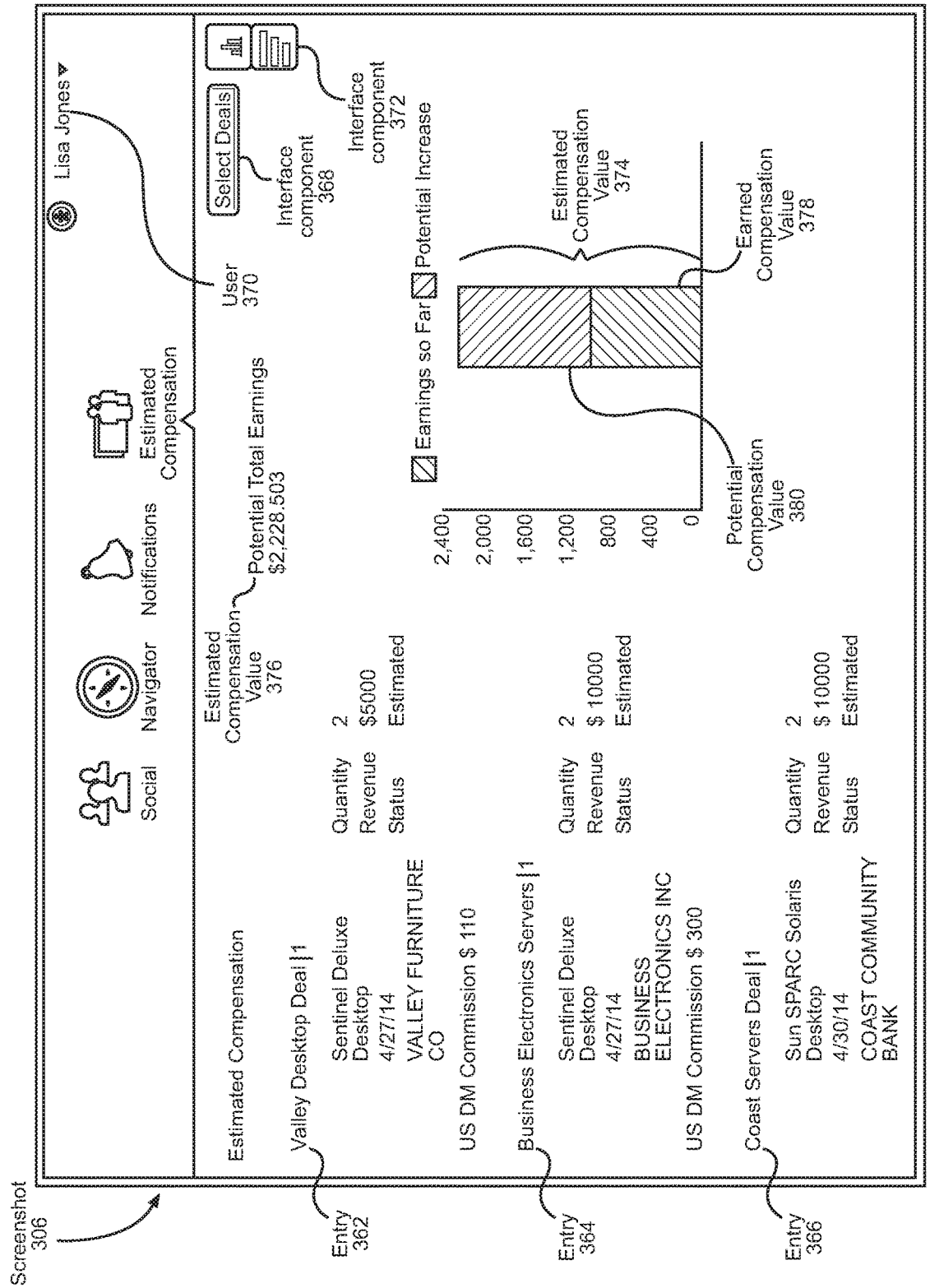

In an example, an estimated compensation value based on one or more materialized sales entries and one or more non-materialized sales entries, for example, selected via screenshot 304, is displayed (Operation 305). As illustrated in FIG. 3D, screenshot 306, including entries 362-366, is a user interface associated with displaying an estimated compensation value. In an example, screenshot 306 is displayed after interface component 358 is selected in screenshot 304. An estimated compensation value is displayed for an individual salesperson or user 370, for example, "Lisa Jones." Entries 362-366 display information from selected non-materialized sales entries. For example, entry 362 is a non-materialized sales entry with the name "Valley Desktop Deal." The anticipated quantity to be sold is 2 and the revenue is $5,000, with a close date of Apr. 27, 2014. If additional non-materialized sales entries are to be selected, interface component 368 may be selected. When interface component 368 is selected, screenshot 304 may be displayed, allowing additional non-materialized sales entries to be selected from the candidate set. Based on one or more materialized sales entries, which may be automatically retrieved, and the selected non-materialized sales entries 362-366, an estimated compensation value computed. The estimated compensation value, here "$2,228.503," is displayed in a bar chart format 374 and/or a numerical value 376. Further, earned compensation value 378 and potential compensation value 380 are displayed. As shown in the bar chart, estimated compensation value 374 is represented by the full bar, earned compensation value 378 is represented by a portion of the bar, as indicated by one color, and potential compensation value is represented by another portion of the bar, as indicated by another color. The amount of earnings is indicated on the y-axis of the bar chart. Here, earned compensation value 378 is approximately $1,000, and potential compensation value 380 is approximately $1,228 (which is, estimated compensation value 374 minus earned compensation value 378). When interface component 372 is selected, options for displaying other representations of the estimated compensation value may be selected. For example, a pie chart may display earned compensation value in one color and potential compensation value in another color. For example, three separate bars may be used to represent estimated compensation value, earned compensation value, and potential compensation value, respectively.

Figure 3E:
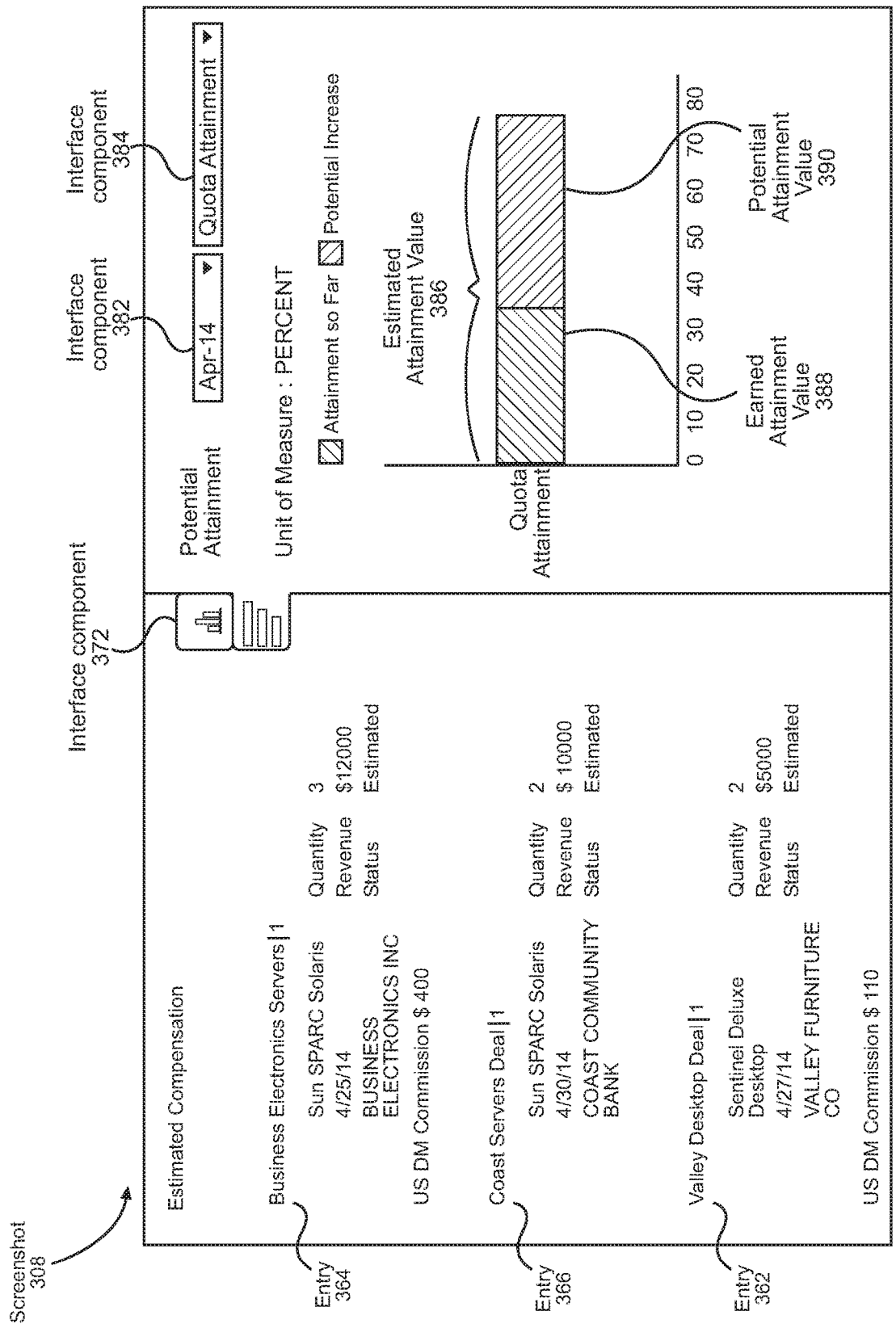

As illustrated in FIG. 3E, screenshot 308, including entries 362-366, is another user interface associated with displaying an estimated compensation value. As in screenshot 306, entries 362-366 display information from selected non-materialized sales entries. Here, however, interface components 382-384 allow a user to select the type of information to be displayed, such as an attainment value and/or an estimated compensation value. As shown, the information displayed is "quota attainment" for the time period "April 2014." An attainment is a measurement of sales events performed, such as a number of units sold, and/or a total revenue earned. A quota attainment is a percentage of an achieved attainment over a target attainment over a given time period. An attainment value may be used to calculate a compensation value. For example, a compensation algorithm is applied to an attainment value and/or a quota attainment to obtain a compensation value. Thus, underlying values used for computing compensation values may be displayed. Here, estimated attainment value 386 is displayed in a bar chart, with a percentage of the quota attainment indicated in the x-axis. Estimated attainment value 386, as shown, represents the attainment based on materialized sales entries and the non-materialized sales entries. Estimated attainment value 386 is represented by the full bar, which is approximately "70%" of the quota. Earned attainment value 388, shown as "Attainment so Far," represents the attainment based on materialized sales entries. Earned attainment value 388 is represented by a portion of the bar, as indicated by one color, and is approximately "30%." Potential attainment value 390, shown as "Potential Increase," represents the increase in attainment based on non-materialized sales entries. Potential attainment value 390 is represented by another portion of the bar, as indicated by another color, and is approximately "40%" (which is, estimated attainment value 386 minus earned attainment value 388). When interface component 372 is selected, options for displaying other representations of the estimated attainment value may be selected.

In an example, a comparison of a first estimated compensation value based on a first selected set of non-materialized sales entries and a second estimated compensation value based on a second selected set of non-materialized sales entries is displayed (Operation 307). A selected set of non-materialized sales entries is referred to herein as a scenario. The non-materializes sales entries are selected from a candidate set via screenshot 304. As illustrated in FIG. 3F, screenshot 310 displays a user interface associated with displaying one or more scenarios. Scenario 394 corresponds to a first selected set of non-materialized sales entries and scenario 396 corresponds to a second selected set of non-materialized sales entries. An estimated compensation value for each scenario is displayed. Here, the estimated compensation value is broken down into different compensation components 392, such as commission and spiff bonus. As shown, for example, for scenario 394, the estimated commission is $100 and the estimated spiff bonus is $30, making a total estimated compensation value of $130, while for scenario 396, the estimated commission is $100 and the estimated spiff bonus is $80, making a total estimated compensation value of $180. Thus, a salesperson would determine that scenario 396 earns a greater compensation value. The salesperson would be incentivized to focus his efforts on the selected set of non-materialized sales entries that correspond to scenario 396.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
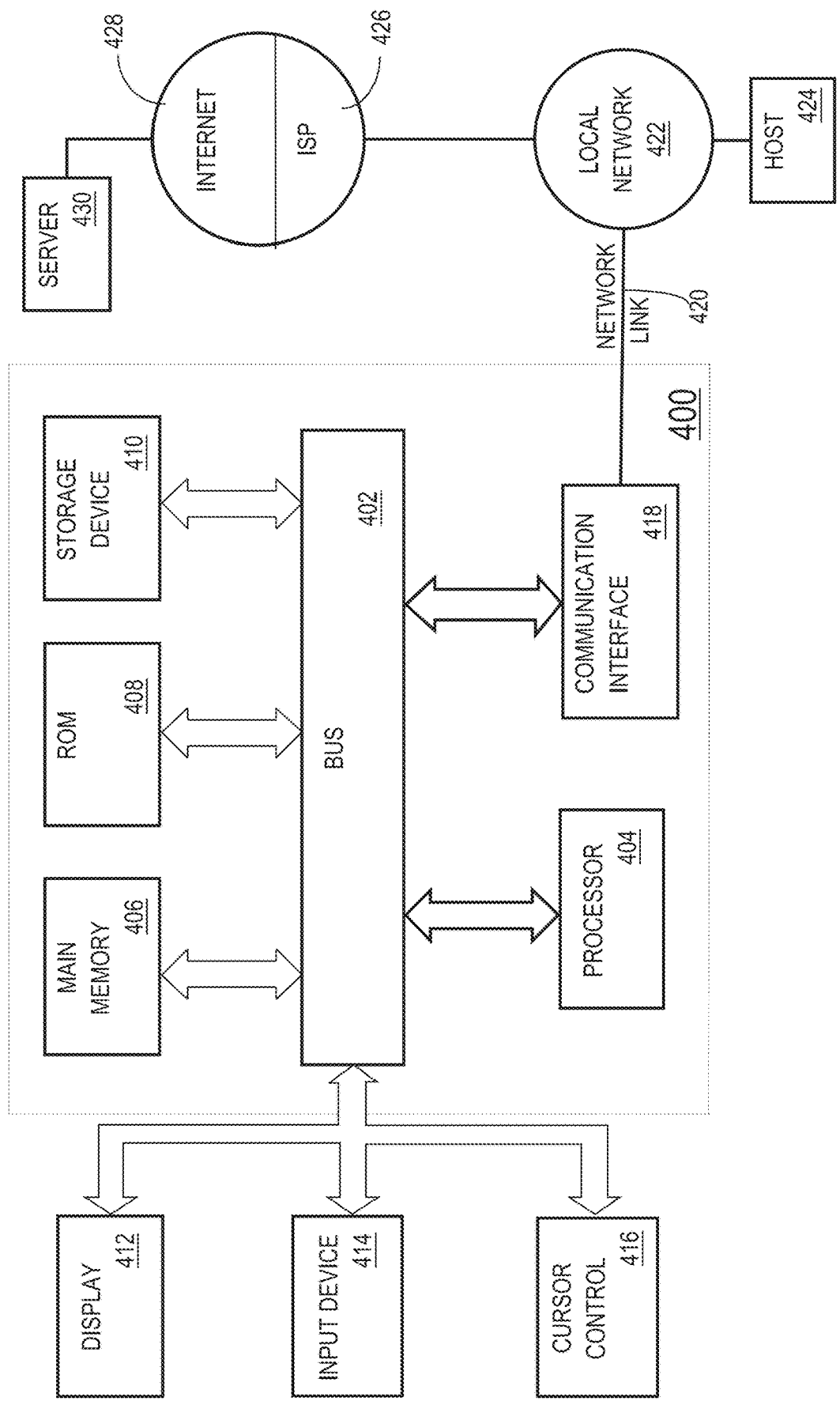
FIG. 4 illustrates a system in accordance with one or more embodiments.

FIG. 4 is a block diagram that illustrates an example of a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 440, such as a magnetic disk or optical disk, is provided and coupled to bus 402 for storing information and instructions.

Computer system 400 may be coupled via bus 402 to a display 442, such as a cathode ray tube (CRT), for displaying information to a computer user. An input device 444, including alphanumeric and other keys, is coupled to bus 402 for communicating information and command selections to processor 404. Another type of user input device is cursor control 446, such as a mouse, a trackball, or cursor direction keys for communicating direction information and command selections to processor 404 and for controlling cursor movement on display 442. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 440. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 440. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 440 either before or after execution by processor 404.

Computer system 400 also includes a communication interface 448 coupled to bus 402. Communication interface 448 provides a two-way data communication coupling to a network link 420 that is connected to a local network 422. For example, communication interface 448 may be an integrated services digital network (ISDN) card, cable modem, satellite modem, or a modem to provide a data communication connection to a corresponding type of telephone line. As another example, communication interface 448 may be a local area network (LAN) card to provide a data communication connection to a compatible LAN. Wireless links may also be implemented. In any such implementation, communication interface 448 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 448, which carry the digital data to and from computer system 400, are example forms of transmission media.

Computer system 400 can send messages and receive data, including program code, through the network(s), network link 420 and communication interface 448. In the Internet example, a server 430 might transmit a requested code for an application program through Internet 428, ISP 426, local network 422 and communication interface 448.

The received code may be executed by processor 404 as it is received, and/or stored in storage device 440, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   receiving, via a graphical user interface (GUI), a first user input that includes one or more sales entry attributes for at least one non-materialized sale associated with an individual salesperson;
   generating a first set of non-materialized sales entries based on the one or more sales entry attributes;
   storing the first set of one or more non-materialized sales entries in a first data object;
   detecting addition of a set of one or more materialized sales entries, associated with the individual salesperson, to a second data object different than the first data object;
   wherein the second data object maintains transactional sales data as stages of a sales cycle are completed;
   wherein at least one of the set of materialized sales entries is entered into the second data object by an application rather than directly entered by any user;
   responsive to detecting the addition of the set of one or more materialized sales entries: continually updating and storing an earned compensation value, for the individual salesperson, corresponding to the set of materialized sales entries stored in the second data object;
   responsive to a second user input initiating an estimation process to generate an estimated compensation value: determining the estimated compensation value, for the individual salesperson, based on (a) the first set of non-materialized sales entries stored in the first data object and (b) the previously determined earned compensation value without accessing the set of materialized sales entries stored in the second data object; and
   concurrently presenting, at the GUI, the estimated compensation value and the earned compensation value.

2. The medium of claim 1, wherein the operations further comprise:
   presenting, at the GUI, one or more interface components configured to receive an attribute of at least one of the first set of non-materialized sales entries associated with the individual salesperson.

3. The medium of claim 1, wherein the operations further comprise:
   presenting, at the GUI, one or more interface components configured to receive a selection of at least one of the first set of non-materialized sales entries from a candidate set of non-materialized sales entries that was previously stored.

4. The medium of claim 1, wherein determining the estimated compensation value for the individual salesperson comprises:
   determining a potential compensation value based on the first set of non-materialized sales entries; and
   determining the estimated compensation value at least by adding the earned compensation value and the potential compensation value.

5. The medium of claim 1, wherein determining the earned compensation value, for the individual salesperson, corresponding to the set of materialized sales entries stored in the second data object comprises:
   accessing the earned compensation value (a) without accessing the set of materialized sales entries from the second data object, and (b) subsequent to receiving a request to present the estimated compensation value at the GUI.

6. The medium of claim 1, wherein the operations further comprise:
   obtaining a second set of one or more non-materialized sales entries associated with the individual salesperson;
   determining a second estimated compensation value, for the individual salesperson, based on (a) the second set of non-materialized sales entries and (b) the set of materialized sales entries; and
   concurrently presenting, at the GUI, the second estimated compensation value and the estimated compensation value.

7. The medium of claim 1, wherein the determining the estimated compensation value for the individual salesperson comprises:

generating a set of estimated sales entries by aggregating the set of materialized sales entries and the first set of non-materialized sales entries; and computing the estimated compensation value based on the set of estimated sales entries.

8. The medium of claim 1, wherein the second data object is not modified based on (a) receiving a request to present the estimated compensation value at the GUI or (b) determining the estimated compensation value.

9. The medium of claim 1, wherein the operations further comprise:
determining a difference value based on a difference between the earned compensation value and the estimated compensation value; and
concurrently presenting, at the GUI, the earned compensation value, the difference value, and the estimated compensation value.

10. The medium of claim 1, wherein the operations further comprise:
determining whether a performance metric is met based on the set of materialized sales entries and the first set of non-materialized sales entries; and
selecting at least one of a plurality of compensation algorithms, based on whether the performance is met, to be used for determining the estimated compensation value.

11. The medium of claim 1, wherein an accelerator function modifies a compensation value corresponding to the set of materialized sales based on whether the first set of non-materialized sales entries are considered materialized or non-materialized.

12. The medium of claim 1, wherein the s second data object is accessed by one or more financial applications.

13. The medium of claim 1, wherein the second data object is configured to record financial information corresponding to an organization to which the individual salesperson belongs.

14. The medium of claim 1, wherein the set of one or more non-materialized sales entries is associated with a user account of the individual salesperson and is retrieved in response to the individual salesperson logging into the user account.

15. The medium of claim 1, wherein the estimated compensation value is based further on a sales trajectory computed as a function of at least the set of materialized sales entries.

16. The medium of claim 1, wherein the operations further comprise:
determining a first potential compensation value corresponding to the first set of non-materialized sales entries;
responsive to a materialization of a particular sales entry of the first set of non-materialized sales entries, removing the particular sales entry from the first set of non-materialized sales entries; and
determining a second potential compensation value corresponding to the first set of non-materialized sales entries after the particular sales entry has been removed.

17. The medium of claim 1, wherein the materialized sales entries and the non-materialized sales entries are stored as a single data structure.

18. The medium of claim 1, wherein the operations further comprise:
receiving the one or more sales entry attributes; and
determining, based on the received sales entry attributes, that the user input requests initiation of an estimation process that generates an estimated compensation value of the individual salesperson based on the first set of one or more non-materialized sales entries.

19. The medium of claim 1, wherein the operations further comprise:
receiving sales cycle data for one or more pending sales;
determining that a sales cycle is complete for a first sale item;
converting the first sale item into a first materialized sale entry;
updating the set of materialized sales entries based on the conversion;
identifying the update to the set of materialized sales entries; and
updating, based on the identification, the earned compensation value associated with the individual salesperson.

20. The medium of claim 1, wherein the operations further comprise:
generating, the first set of one or more non-materialized sales entries without receiving the user input; and
presenting, at the GUI, one or more interface components configured to receive a selection of at least one of the first set of non-materialized sales entries that were generated without receiving the user input.

21. The medium of claim 1, wherein the operations further comprise:
predicting at least one future sales event for the individual salesperson, based on historical sales data for the individual salesperson;
based on the prediction, determining a first sales trajectory for the individual salesperson;
defining one or more attributes of a first non-materialized sales entry based on the first sales trajectory;
storing, in the first data object, the first non-materialized sales entry; and
presenting, at the GUI, one or more interface components configured to receive a selection of the first non-materialized sales entry.

22. The medium of claim 1, wherein the operations further comprise:
retrieving the set of one or more materialized sales entries from the first data object without first staging the set of one or more materialized sales entries in a third data object; and
generating the earned compensation value based on the retrieved set of one or more materialized sales entries.

23. A method, comprising:
receiving, via a graphical user interface (GUI), a first user input that includes one or more sales entry attributes for at least one non-materialized sale associated with an individual salesperson;
generating a first set of non-materialized sales entries based on the one or more sales entry attributes;
storing the first set of one or more non-materialized sales entries in a first data object;
detecting addition of a set of one or more materialized sales entries, associated with the individual salesperson, to a second data object different than the first data object;
wherein the second data object maintains transactional sales data as stages of a sales cycle are completed;
wherein at least one of the set of materialized sales entries is entered into the second data object by an application rather than directly entered by any user;
responsive to detecting the addition of the set of one or more materialized sales entries: continually updating and storing an earned compensation value, for the individual salesperson, corresponding to the set of materialized sales entries stored in the second data object;

responsive to a second user input initiating an estimation process to generate an estimated compensation value:
determining the estimated compensation value, for the individual salesperson, based on (a) the first set of non-materialized sales entries stored in the first data object and (b) the previously determined earned compensation value without accessing the set of materialized sales entries stored in the second data object; and concurrently presenting, at the GUI, the estimated compensation value and the earned compensation value.

24. A system, comprising:

at least one device including a hardware processor; and the system being configured to perform operations comprising:

receiving, via a graphical user interface (GUI), a first user input that includes one or more sales entry attributes for at least one non-materialized sale associated with an individual salesperson;

generating a first set of non-materialized sales entries based on the one or more sales entry attributes;

storing the first set of one or more non-materialized sales entries in a first data object;

detecting addition of a set of one or more materialized sales entries, associated with the individual salesperson, to a second data object different than the first data object;

wherein the second data object maintains transactional sales data as stages of a sales cycle are completed;

wherein at least one of the set of materialized sales entries is entered into the second data object by an application rather than directly entered by any user;

responsive to detecting the addition of the set of one or more materialized sales entries: continually updating and storing an earned compensation value, for the individual salesperson, corresponding to the set of materialized sales entries stored in the second data object;

responsive to a second user input initiating an estimation process to generate an estimated compensation value:
determining the estimated compensation value, for the individual salesperson, based on (a) the first set of non-materialized sales entries stored in the first data object and (b) the previously determined earned compensation value without accessing the set of materialized sales entries stored in the second data object; and concurrently presenting, at the GUI, the estimated compensation value and the earned compensation value.

* * * * *

UNITED STATES PATENT AND TRADEMARK OFFICE
CERTIFICATE OF CORRECTION

| | | |
|---|---|---|
| PATENT NO. | : 11,238,392 B2 | Page 1 of 1 |
| APPLICATION NO. | : 14/788536 | |
| DATED | : February 1, 2022 | |
| INVENTOR(S) | : Naganathan et al. | |

It is certified that error appears in the above-identified patent and that said Letters Patent is hereby corrected as shown below:

On the Title Page

In Column 1, under (72) Inventors, Lines 2-3, delete "San Franciso, CA (US)" and insert -- San Francisco, CA (US) --, therefor.

In the Claims

In Column 19, Line 32, in Claim 12, delete "the s second" and insert -- the second --, therefor.

Signed and Sealed this
Thirty-first Day of May, 2022

*Katherine Kelly Vidal*

Katherine Kelly Vidal
*Director of the United States Patent and Trademark Office*